UNITED STATES PATENT OFFICE.

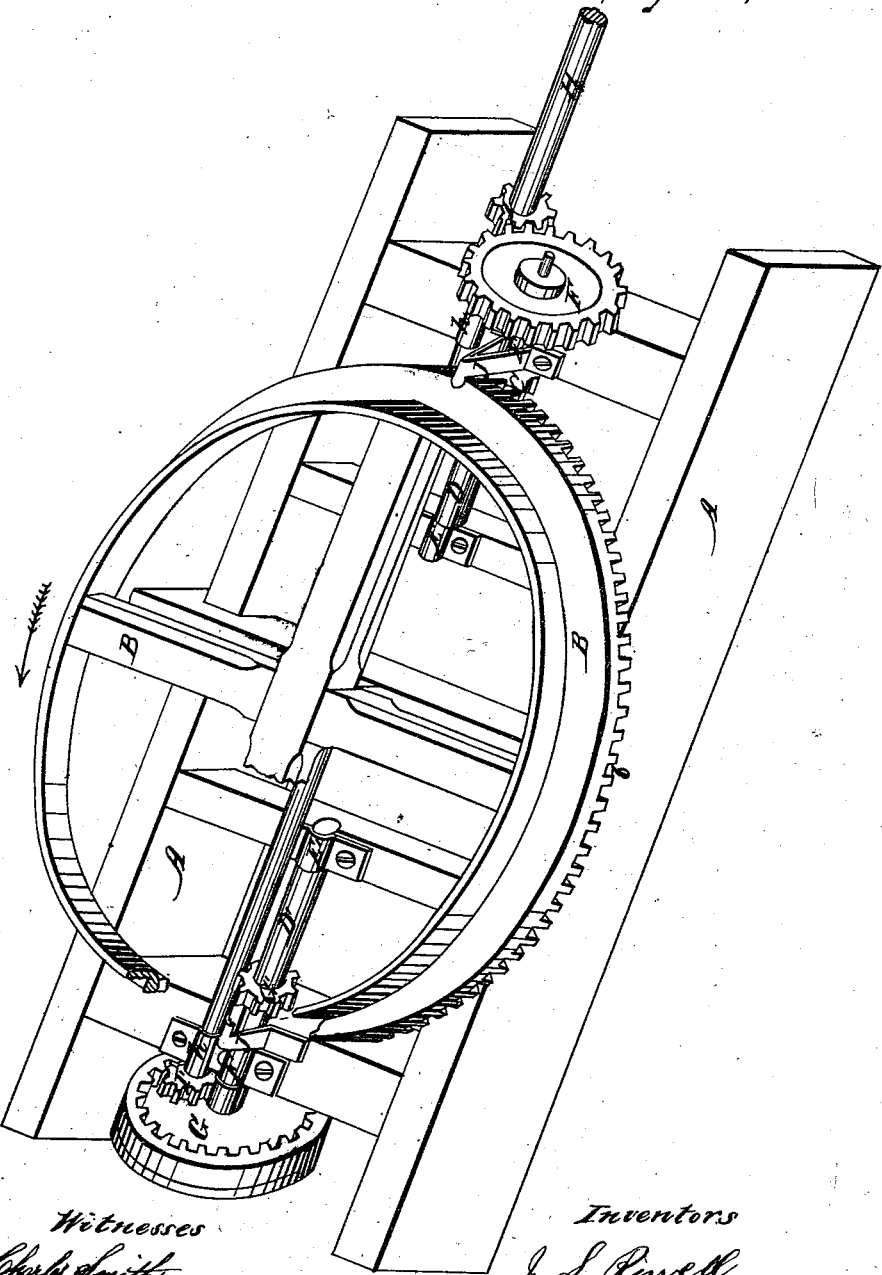

JOHN S. ROWELL AND MICHAEL F. LOWTH, OF BEAVER DAM, WISCONSIN.

IMPROVEMENT IN HORSE-POWERS.

Specification forming part of Letters Patent No. 36,575, dated September 30, 1862.

*To all whom it may concern:*

Be it known that we, JOHN S. ROWELL and MICHAEL F. LOWTH, both of Beaver Dam, in the county of Dodge and State of Wisconsin, have invented a new and useful Improvement in Horse-Powers; and we do hereby declare the following to be a full and exact description of the same, reference being had to the accompanying drawing, making part of this specification, and being a perspective view of a horse-power illustrating our invention.

Our improvement relates to that class of horse-powers in which a horizontal master-wheel is made to act upon two pinions secured to a tumbling-shaft which extends the whole length of the power; and the invention particularly consists in an improved arrangement of parts, whereby the friction upon the bearings is reduced, and the wheels caused to continue to work well in gear after having become somewhat worn.

To enable others skilled in the art to which our invention appertains to fully understand and use the same, we will proceed to describe its construction and operation.

A is the stationary frame or bed. B is the "master-wheel" or main driving-wheel to which the sweeps are attached. The said master-wheel is provided on its under face, near its circumference, with bevel-cogs $b$, which take into pinions C C' upon short horizontal shafts D D', running in bearings E E'. The shaft D carries at its outer end a cog-wheel, F, and the shaft D' an internal-gear wheel, G.

H is a tumbling-shaft extending from end to end of the power, and as far in one direction as may be needful for the attachment of the band-pulley or other means of communicating motion to the machinery to be driven. The said tumbling-shaft runs in bearings $h\ h$, and is provided with pinions I and I', which gear with the wheels F and G, respectively.

J J' are clips secured to the main frame A, and engaging over the master-wheel B to hold it in gear with the pinions C C'.

In the drawing a portion of the master-wheel is represented as broken away, in order to show the parts beneath.

It will be observed that as the master-wheel is caused to revolve in the direction of the arrow the lateral pressure thereby exerted upon the shafts D D' through the pinions C C' will draw both the wheels F G firmly into gear with the pinions I and I', and as resistance is applied to the shaft H the pressure, being in the opposite direction, will in a great degree equalize and reduce the friction upon the bearings. In like manner the pressure upon opposite sides of the tumbling-shaft equalizes and reduces the friction in the bearings $h$.

As the bearings and gears wear away, the wheels F and G are still drawn into contact with their pinions, and the machine thus caused to operate with unimpaired effect.

This invention entirely dispenses with the necessity for friction-rollers, which, with horse-powers having bevel-gears running at a high speed, are usually required to hold the said wheels in gear.

We do not claim the invention of a tumbling-shaft driven by two bevel or horizontal gear-wheels and pinions; but,

Having thus described our invention, what we claim as new therein, and desire to secure by Letters Patent, is—

The described arrangement of the master-wheel B $b$, pinion-shafts D D', cog-wheel F, internal-gear wheel, G, tumbling-shaft H, and pinions I I', the whole constructed and operating in the manner and for the purposes specified.

JOHN S. ROWELL.
MICHAEL F. LOWTH.

Witnesses:
A. P. LAWRENCE,
I. B. RICORD.